(12) United States Patent
Dandamudi

(10) Patent No.: US 10,572,794 B2
(45) Date of Patent: Feb. 25, 2020

(54) NFC RING

(71) Applicant: NXP B.V., Eindhoven (NL)

(72) Inventor: Srikanth Dandamudi, Bangalore (IN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/125,679

(22) Filed: Sep. 8, 2018

(65) Prior Publication Data

US 2019/0080220 A1    Mar. 14, 2019

(30) Foreign Application Priority Data

Sep. 8, 2017  (EP) .................................... 17190052

(51) Int. Cl.
| G06K 19/06 | (2006.01) |
| G06K 7/08 | (2006.01) |
| G06K 19/077 | (2006.01) |
| H04B 5/00 | (2006.01) |
| A44C 9/00 | (2006.01) |

(52) U.S. Cl.
CPC .  *G06K 19/07762* (2013.01); *G06K 19/07773* (2013.01); *H04B 5/0031* (2013.01); *A44C 9/0053* (2013.01)

(58) Field of Classification Search
USPC ................................................ 235/451, 492
See application file for complete search history.

(56) References Cited

U.S. PATENT DOCUMENTS

| 9,450,306 | B1 | 9/2016 | Ebnabbasi | |
| 2011/0210931 | A1* | 9/2011 | Shai | G06F 3/014 |
| | | | | 345/173 |
| 2014/0139422 | A1* | 5/2014 | Mistry | G06F 3/014 |
| | | | | 345/156 |
| 2014/0279528 | A1* | 9/2014 | Slaby | H04L 63/0853 |
| | | | | 705/44 |
| 2015/0220109 | A1* | 8/2015 | von Badinski | G01P 15/00 |
| | | | | 340/539.12 |
| 2015/0277559 | A1* | 10/2015 | Vescovi | G06F 3/014 |
| | | | | 345/173 |
| 2016/0077582 | A1* | 3/2016 | Song | G06F 3/0338 |
| | | | | 345/173 |

(Continued)

FOREIGN PATENT DOCUMENTS

WO        2017/135550 A1     8/2017

OTHER PUBLICATIONS

Extended European Search Report for Patent Appln. No. 17190052.5 (dated Mar. 12, 2018).

*Primary Examiner* — Tuyen K Vo

(57) ABSTRACT

In accordance with a first aspect of the present disclosure, a near field communication (NFC) ring is provided, comprising a processing unit and one or more rotatable components, wherein said processing unit is configured to perform one or more predefined functions in response to one or more predefined rotations of said components. In accordance with a second aspect of the present disclosure, a method of operating a near field communication (NFC) ring is conceived, said NFC ring comprising a processing unit and one or more rotatable components, wherein said processing unit performs one or more predefined functions in response to one or more predefined rotations of said components. In accordance with a third aspect of the present disclosure, a corresponding computer program is provided.

11 Claims, 5 Drawing Sheets

(56) References Cited

U.S. PATENT DOCUMENTS

2016/0156603 A1* 6/2016 Janik ............... H04L 63/0492
                                                    726/7
2016/0378100 A1* 12/2016 Dow .................. A61F 2/70
                                                    700/275
2016/0378184 A1* 12/2016 Dow ................. G06F 3/0227
                                                    345/173

* cited by examiner

NFC RING

CROSS-REFERENCE TO RELATED APPLICATIONS

This application claims the priority under 35 U.S.C. § 119 of European patent application no. 17190052.5, filed on Sep. 8, 2017, the contents of which are incorporated by reference herein.

OVERVIEW

The present disclosure relates to a near field communication (NFC) ring. Furthermore, the present disclosure relates to a method of operating an NFC ring, and to a corresponding computer program. NFC rings are rings that include an NFC chip and an NFC antenna. NFC rings may be used, for example, to unlock an NFC-enabled mobile device or another object (e.g., a vehicle or a door), to authorize certain transactions such as fare payments, to share data with other devices, and to start certain applications with custom settings. NFC rings are often not very flexible, in the sense that their functionality cannot be changed very easily.

SUMMARY

In accordance with a first aspect of the present disclosure, a near field communication (NFC) ring is provided, comprising a processing unit and one or more rotatable components, wherein said processing unit is configured to perform one or more predefined functions in response to one or more predefined rotations of said components.

In an embodiment, one of said components is an outer portion of said NFC ring, said outer portion being arranged to rotate with respect to an inner portion of said NFC ring.

In an embodiment, the processing unit is configured to determine an angle of rotation between the outer portion and the inner portion, and to select one or more functions in dependence on said angle.

In an embodiment, said angle of rotation falls within an angle range associated with said one or more functions.

In an embodiment, the processing unit is configured to determine said angle of rotation by comparing a field dampening effect caused by the rotation with one or more stored reference values.

In an embodiment, said reference values are stored in a memory unit of an NFC chip of said NFC ring.

In an embodiment, the memory is an electrically erasable programmable read-only memory.

In an embodiment, the NFC ring further comprises a visual aid for showing the angle of rotation to a user.

In an embodiment, one of said components is a recoiling spring equipped with a sensor.

In an embodiment, the processing unit is configured to determine a sequence of clockwise and anticlockwise rotations of the recoiling spring, and to select one or more functions in dependence on said sequence.

In an embodiment, one of said functions comprises disabling the NFC ring.

In accordance with a second aspect of the present disclosure, a method of operating a near field communication (NFC) ring is conceived, said NFC ring comprising a processing unit and one or more rotatable components, wherein said processing unit performs one or more predefined functions in response to one or more predefined rotations of said components.

In accordance with a third aspect of the present disclosure, a computer program comprising non-transient executable instructions is provided that, when executed by a processing unit, carry out or control a method of the kind set forth.

In an embodiment, a non-transitory computer-readable medium comprises said computer program.

DESCRIPTION OF DRAWINGS

Embodiments will be described in more detail with reference to the appended drawings, in which.

DESCRIPTION OF EMBODIMENTS

Figure 1A:
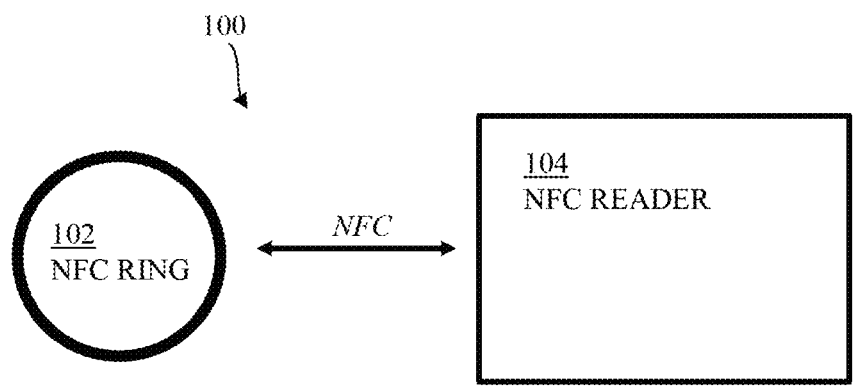
FIG. 1A shows an example of an NFC system.

FIG. 1A shows an example of an NFC system 100. The NFC system 100 comprises an NFC ring 102 that is configured to carry out near field communication (NFC) with an NFC reader 104. The NFC reader 104 may, for example, be a standalone device or a device embedded in a mobile device. The NFC ring 102 includes an NFC chip (not shown) and an NFC antenna (not shown). The NFC ring 102 may be used, for example, to unlock an NFC-enabled mobile device or another object, to authorize certain transactions such as fare payments, to share data with other devices, and to start certain applications with custom settings. The NFC ring 102 may take the form of a material ring, i.e. a small circular band worn on a finger as an ornament or a token of, for example, marriage, engagement, or authority. As mentioned above, the NFC ring 102 may not be very flexible, in the sense that its functionality cannot be changed very easily.

Figure 1B:
FIG. 1B shows an example of an NFC ring.

FIG. 1B shows an example of an NFC ring. This NFC ring is marketed under the trademark NFC Ring®.

In accordance with the present disclosure, an NFC ring is provided, comprising a processing unit and one or more rotatable components, wherein the processing unit is configured to perform one or more predefined functions in response to one or more rotations of said components. In this way, the functionality of the NFC ring can be changed quickly and easily.

Figure 2:
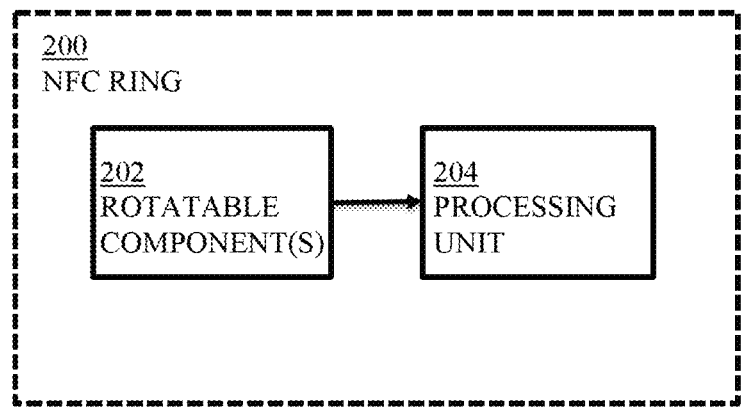
FIG. 2 shows an illustrative embodiment of an NFC ring.

FIG. 2 shows an illustrative embodiment of an NFC ring 200. The NFC ring 200 comprises one or more rotatable components 202. Furthermore, the NFC ring 200 comprises a processing unit 204. The processing unit 204 is configured to perform one or more predefined functions in response to one or more rotations of said components 202. For example, a first function may comprise unlocking an NFC-enabled mobile device, a second function may comprise unlocking a door, a third function may comprise authorizing a certain transaction, etc.

Figure 3:
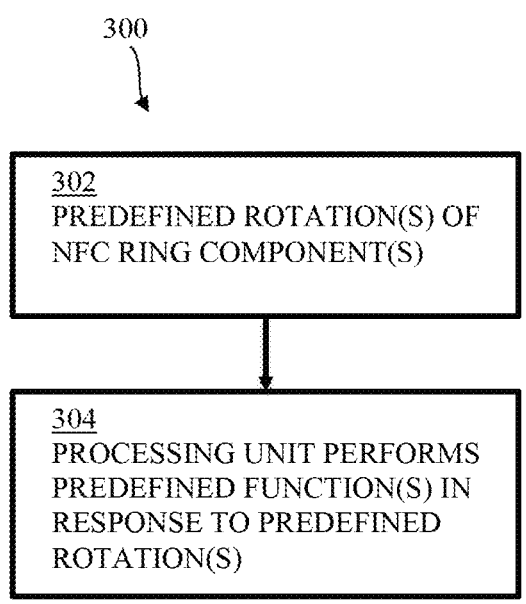
FIG. 3 shows an illustrative embodiment of an operating method.

FIG. 3 shows an illustrative embodiment of an operating method 300. In particular, it shows a method of operating an NFC ring 200 of the kind shown in FIG. 2. In operation, the NFC ring component or components 202 perform, at 302, one or more predefined rotations. These rotations may be initiated by a user, as will be shown with examples hereinbelow. Furthermore, at 304, the processing unit 204 performs one or more predefined functions in response to the predefined rotation or rotations of the components 202. In a practical and efficient implementation, the method 300 may be carried out or controlled by a computer program executed by the processing unit 204.

Figure 4:
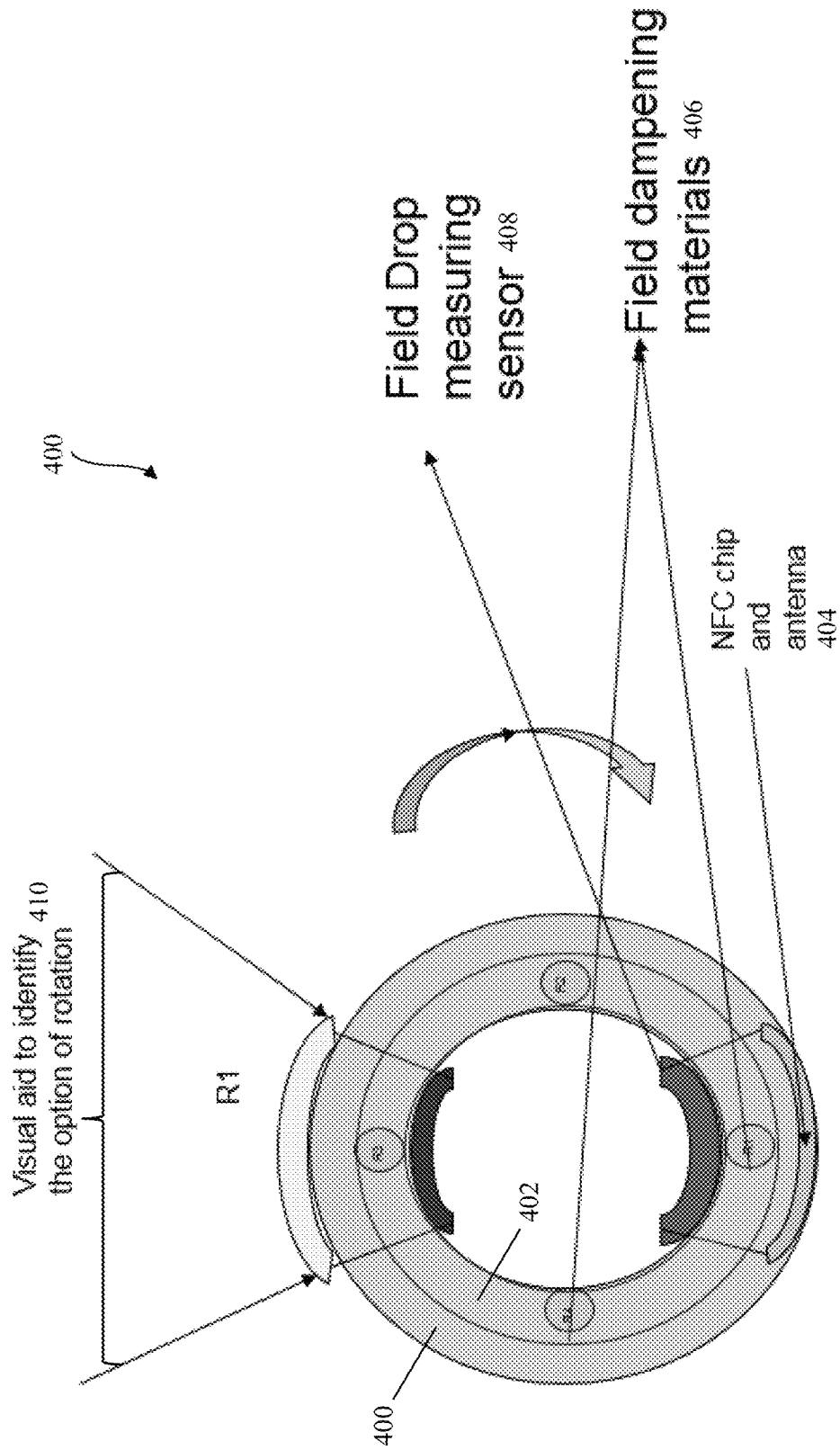
FIG. 4 shows another illustrative embodiment of an NFC ring.

FIG. 4 shows another illustrative embodiment of an NFC ring 400. The NFC ring 400 comprises an inner portion 402 (i.e., an inner ring or inner circle) and an outer portion 400 (i.e., an outer ring or outer circle). As mentioned above, in an embodiment, one of said components is an outer portion of said NFC ring, said outer portion being arranged to rotate with respect to an inner portion of said NFC ring. This embodiment, which is shown in FIG. 4, results in a practical and efficient implementation. More specifically, the outer ring or outer circle can slide over the inner ring or inner circle. Furthermore, in an embodiment, the processing unit is configured to determine an angle of rotation between the outer portion 400 and the inner portion 402, and to select one or more functions in dependence on said angle. The angle of rotation is a suitable parameter which can easily be determined. For instance, as shown in FIG. 4, the angle of rotation can be determined by measuring a field dampening effect caused by the rotation. More specifically, a rotation of the outer portion 400 with respect to the inner portion 402 causes that a specific field dampening material 406—i.e., R1, R2, R3, or R4—is brought into proximity of a field drop measuring sensor 408. Each of the different field dampening materials 406 may cause a different field dampening effect, so that a rotation effectively causes different field dampening effects depending on the angle of rotation. The NFC chip may comprise a processing unit of the kind set forth. Furthermore, the NFC chip may read out the field dampening effect measured by the field drop measuring sensor 408, and may select one or more functions in dependence on the measured value provided by the field drop measuring sensor 408. More specifically, the field dampening effect may be determined by measuring, directly or indirectly, a capacitance increase or capacitance reduction which is caused by a different dielectric medium (i.e., field dampening material) coming into proximity of the sensor 408. The processing unit may select said functions by comparing the received measured value with one or more stored reference values, for example, and select the function or functions associated with the matching reference value.

In a practical and efficient implementation, the angle of rotation falls within a range associated with said one or more functions. For instance, in FIG. 4, four angle ranges (not shown) may be defined, wherein each of the angle ranges comprises one of the field dampening materials 406. In other words, each angle range corresponds to a different field dampening effect. Thus, more generally speaking, the circle formed by the ring may be split into predefined (e.g., equal) angle ranges. These angle ranges may be regarded as slices or pies. Each angle range may have a different field dampening effect. These effects may be pre-calibrated into a memory unit of the NFC chip, i.e. in the form of stored reference values. The processing unit may compare measured field dampening effects with stored reference values, and, in case of a match, select the corresponding function or functions. In a practical and efficient implementation, the memory unit is an electrically erasable programmable read-only memory (EEPROM). Furthermore, in this example, the NFC ring 400 comprises a visual aid 410 to identify the option of rotation. In other words, the NFC ring 400 comprises a visual aid 410 that shows the angle of rotation to a user. In this way, the user may easily select a desired functionality.

Figure 5:
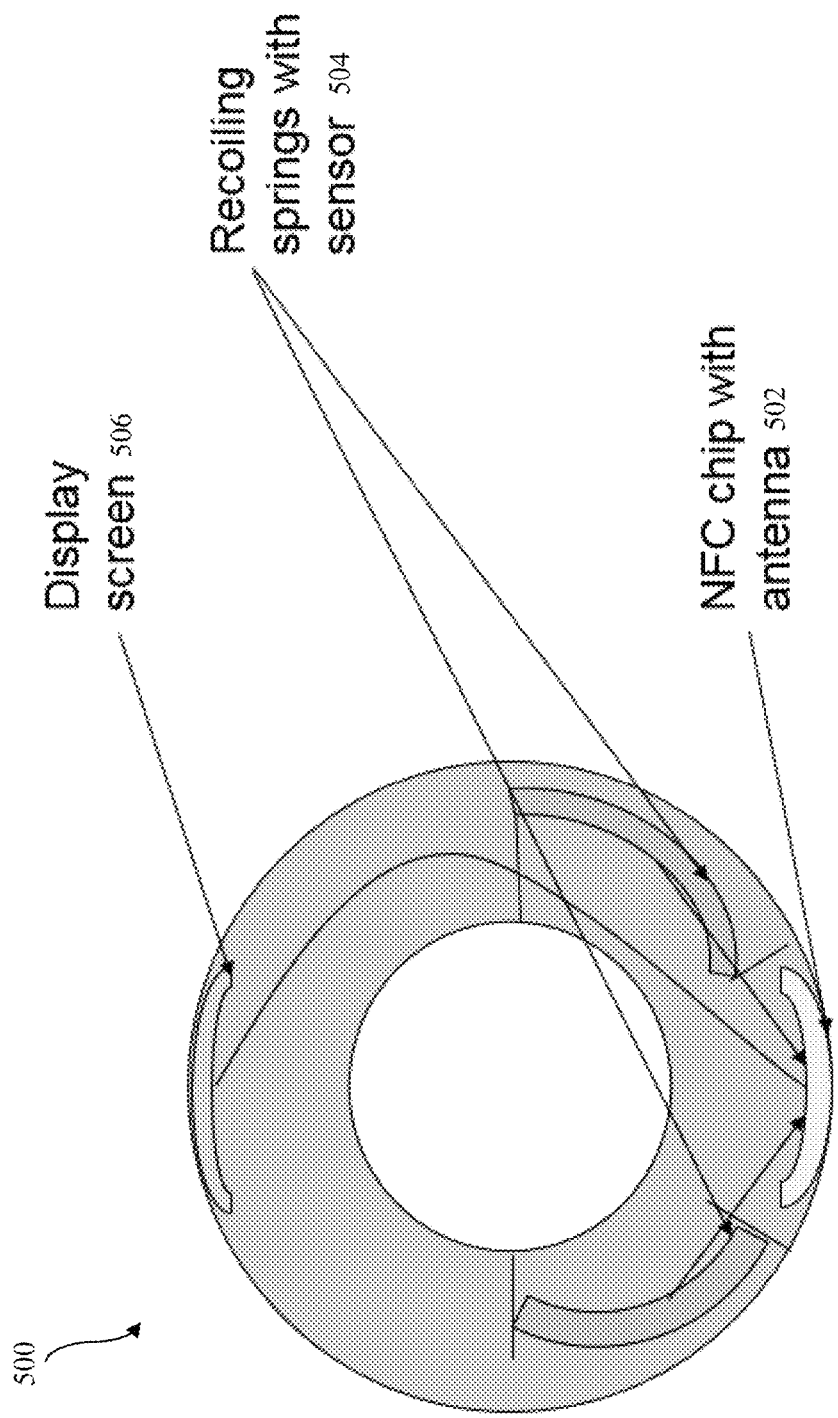
FIG. 5 shows a further illustrative embodiment of an NFC ring.

FIG. 5 shows a further illustrative embodiment of an NFC ring 500. The NFC ring 500 comprises two recoiling springs with a sensor 504, and an NFC chip 502. In addition, the NFC ring 500 comprises a display screen 506. As mentioned above, in an embodiment, one of the NFC ring components is a recoiling spring equipped with a sensor. This embodiment, which is shown in FIG. 5, is another practical and efficient implementation of a rotatable component. In FIG. 5 two recoiling springs 504 are shown as an example. The rotation of the spring or springs is measured by sensors attached to the springs. The measured value is provided to a processing unit (not shown) of the NFC chip 502, which compares said measured value with one or more stored reference values and selects one or more functions in dependence on the result of the comparison. The display screen 506 may be configured to show the selected function or functions. In an embodiment, the processing unit is configured to determine a sequence of clockwise and anti-clockwise rotations of the recoiling spring, and to select one or more functions in dependence on said sequence. Thus, since many different sequences of this kind are possible, many different functions can be selected by the user. Furthermore, in an embodiment, one of said functions comprises disabling the NFC ring. In this way, the NFC ring can be temporarily disabled and easily reactivated by rotating the ring's component or components.

Figure 6:
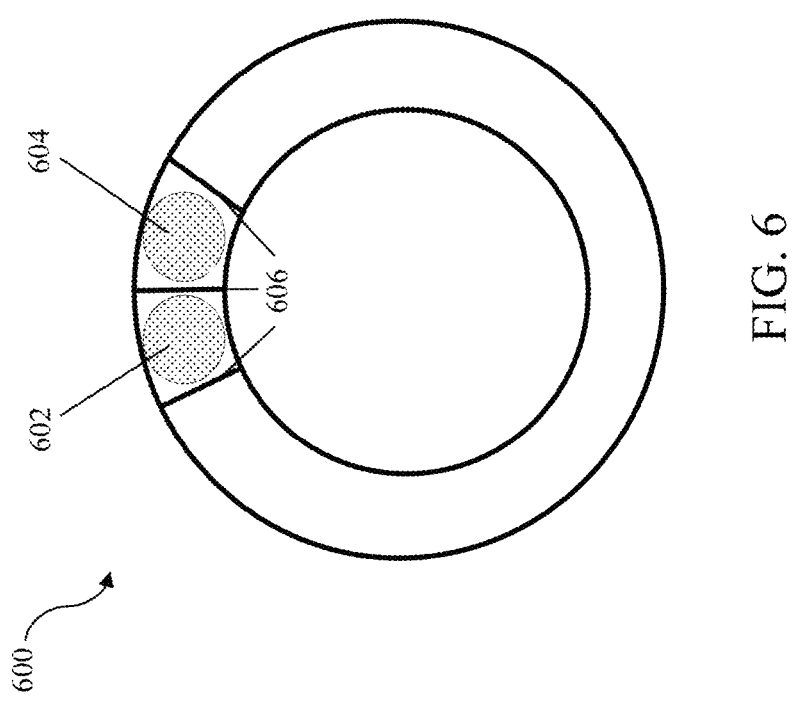
FIG. 6 shows a further illustrative embodiment of an NFC ring.

FIG. 6 shows a further illustrative embodiment of an NFC ring 600. In particular, it shows an example of a sensing principle that can be applied in the embodiment shown in FIG. 5. As mentioned above, sensors may be attached to the recoiling springs 504 shown in FIG. 5. These sensors may measure a capacitance increase or capacitance reduction of a first capacitor 602 and a second capacitor 604. The first and second capacitor 604 may be formed by dielectric materials between metal plates 606. Two of said plates 606 may be stationary and one of said plates 606 may be movable. Alternatively, one of said plates 606 may be stationary and two of said plates 606 may be movable. In any case, a deformation of a spring causes the movable plate or plates to move with respect to the stationary plate or plates, such that one of the dielectric materials is compressed and the other dielectric material is expanded. The resulting capacitance changes of the first capacitor 602 and second capacitor 604 can be measured by any suitable sensor. The skilled person will appreciate that other sensors can equally well be applied to the embodiment shown in FIG. 5.

The systems and methods described herein may at least partly be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" or "memory unit" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 NFC system
102 NFC ring
104 NFC reader
106 NFC ring
200 NFC ring
202 rotatable component(s)
204 processing unit
300 operating method
302 predefined rotation(s) of NFC ring component(s)
304 processing unit performs predefined function(s) in response to predefined rotation(s)
400 NFC ring
400 outer portion
402 inner portion
404 NFC chip and antenna
406 field dampening materials
408 field drop measuring sensor
410 visual aid to identify the option of rotation
500 NFC ring
502 NFC chip with antenna
504 recoiling springs with sensor
506 display screen
600 NFC ring
602 first capacitor
604 second capacitor
606 metal plates

The invention claimed is:

1. A near field communication, NFC, ring, comprising one or more rotatable components and an NFC chip and an NFC antenna, wherein the one or more rotatable components is an outer portion of said NFC ring, the outer portion arranged to rotate with respect to an inner portion of said NFC ring, wherein the NFC chip and NFC antenna are integrated into one of the one or more rotatable components of the NFC ring, the NFC chip including a processing unit, wherein said processing unit of the NFC chip is configured to perform one or more predefined functions in response to one or more predefined rotations of said components, wherein the processing unit is configured to determine an angle of the rotation between the outer portion and the inner portion by comparing a field dampening effect caused by the rotation with one or more stored reference values, and to select one or more of the predefined functions in dependence on said angle.

2. The NFC ring of claim 1, wherein said angle of rotation falls within an angle range associated with said one or more functions.

3. The NFC ring of claim 1, wherein said reference values are stored in a memory unit of the NFC chip of said NFC ring.

4. The NFC ring of claim 3, wherein the memory is an electrically erasable programmable read-only memory.

5. The NFC ring of claim 1, further comprising a visual aid for showing the angle of rotation to a user.

6. The NFC ring of claim 1, wherein one of said components is a recoiling spring equipped with a sensor.

7. The NFC ring of claim 6, wherein the processing unit is configured to determine a sequence of clockwise and anticlockwise rotations of the recoiling spring, and to select one or more functions in dependence on said sequence.

8. The NFC ring of claim 1, wherein one of said functions comprises disabling the NFC ring.

9. A method of operating a near field communication, NFC, ring, said NFC ring comprising one or more rotatable components and an NFC chip and an NFC antenna, wherein the NFC chip and NFC antenna are integrated into one of the one or more rotatable components of the NFC ring, wherein the one or more rotatable components is an outer portion of said NFC ring, the outer portion arranged to rotate with respect to an inner portion of said NFC ring, the NFC chip including a processing unit, wherein said processing unit performs one or more predefined functions in response to one or more predefined rotations of said components, and wherein the processing unit is configured to determine an angle of the rotation between the outer portion and the inner portion by comparing a field dampening effect caused by the rotation with one or more stored reference values, and to select one or more of the predefined functions in dependence on said angle.

10. A computer program comprising non-transient executable instructions that, when executed by a processing unit, carry out or control the method of claim 9.

11. A non-transitory computer-readable medium comprising the computer program of claim 10.

* * * * *